C. & J. G. ROWLAND.
MACHINE FOR MAKING CONDENSED LEATHER PEGS.
No. 68,006.
Patented Aug. 20, 1867.
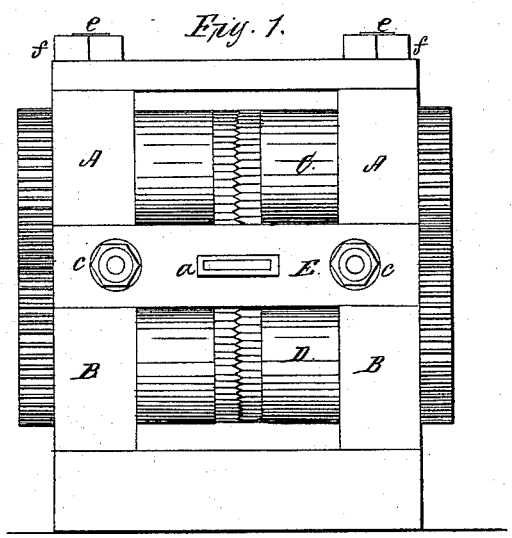
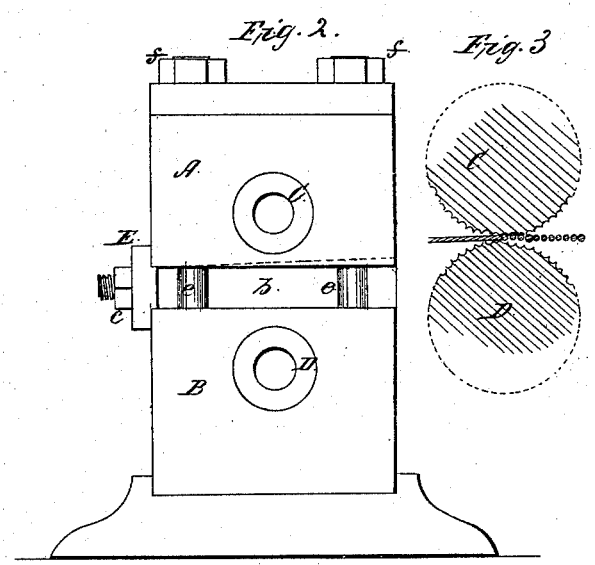
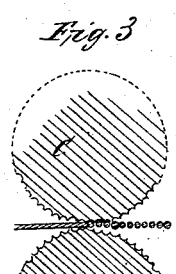
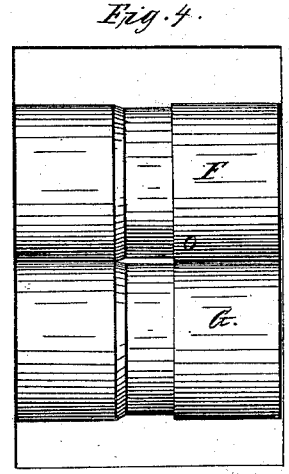
Witnesses:
Inventors:

United States Patent Office.

CHARLES ROWLAND AND JOSEPH G. ROWLAND, OF QUINCY, ILLINOIS.

Letters Patent No. 68,006, dated August 20, 1867.

---

MACHINES FOR MAKING CONDENSED-LEATHER PEGS.

---

*The Schedule referred to in these Letters Patent and making part of the same.*

---

TO ALL WHOM IT MAY CONCERN:

Be it known that we, C. ROWLAND and J. G. ROWLAND, of Quincy, in the county of Adams, and State of Illinois, have invented a certain new and improved Mode or Process of Manufacturing Pegs, and also a Machine for Making the said Pegs; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

The present invention has relation to a new method of manufacturing pegs, and the machines to be used for that purpose, the process and machines having more especial reference to a newly-invented peg made of leather compressed, and for which we have filed application for Letters Patent of even date herewith, although the process and machines are also adapted to the manufacture of other and various kinds of pegs.

Our newly-invented peg consists of leather, and to form the leather into pegs suitable for use in the manufacture of boots, shoes, and similar articles, we submit the leather to a process of condensation by compression. This may be accomplished in a variety of ways, according to the manner in which it is intended to use the pegs. Those intended for what is denominated custom-work, or that in which each peg is driven singly by hand or otherwise, are made into separate pegs; while those intended for use in machine-work are formed in a continuous series of pegs slightly joined at their edges; or they may be made in the form of a continuous strip, to be afterwards cut into separate pegs, as is customary with the wooden pegs used in machines.

Figure 1 represents a front elevation, and

Figure 2 an end elevation of a machine for making our pegs singly or in a series.

Figure 3 represents a cross-section of the rolls, and

Figure 4 represents a modification of the rolls for making the pegs in a strip.

We prepare two strong metal rolls, C D, by cutting or otherwise forming on their periphery a series of recesses or indentations of proper form and size to correspond with the shape and size that it is intended to give to the pegs. These recesses are cut on each roll, so as to form a die or mould of one-half of the size of the peg when finished, so that when the two rolls are placed opposite each other and brought together, the recesses in the two shall form a complete die of the exact size and form that it is intended to give to the peg, as shown in cross-section in fig. 3. These recesses are made longitudinally on the rolls, side by side, so as to form a series extending entirely around the rolls, as represented in fig. 1, there being in this case two series encircling the rolls, the points of one series interlocking with those of the other series, so as to form two series of pegs at once, as represented in fig. 1. It is obvious that, if desired, any number of series may be thus arranged on the rolls, so as to cover their entire surface if desired. These rolls thus made are mounted in a strong frame, consisting at each end of strong blocks, A and B, forming bearings for the journals of the rolls, and the blocks being held together by strong vertical rods, e, which have nuts, f, at their upper ends, by which the blocks with their rolls may be adjusted as desired, as represented in fig. 2. Between the blocks A and B, on each side, is placed a wedge, b, sliding in suitable grooves in the adjoining edges of the blocks, the ends of said wedges having a screw formed thereon, and being provided with nuts, c, as shown in fig. 2, so that by loosening the nuts f, and screwing up the nuts c, the rolls may be adjusted further apart when necessary. These rolls are made hollow, with a hole extending through their journals, as shown in fig. 2, for the purpose of admitting steam, or otherwise heating the rolls, if desired. Upon the side of the frame is secured a cross-bar or plate, E, through which an opening, a, is made, as shown in fig. 1, to feed the strip of leather through to the rolls, there being a spout or other guide extending from the bar E to the rolls, so as to guide the strip of leather accurately to the dies, and insure its passing between the rolls in a proper manner. The rolls are provided with gear-wheels at one or both ends, as shown in fig. 1, the wheels on one roll engaging with those on the other, so as to insure the rolls revolving together accurately, these gears, of course, being so adjusted as to cause the dies or recesses in the rolls to come exactly opposite each other, as represented in fig. 3. When thus arranged the rolls are set in motion, and a strip of leather is fed through the mouth a between the rolls, which, as they revolve, compress the leather and force it into the dies, thereby greatly compacting or condensing it, and at the same time pressing and cutting it into a continuous series of pegs which will be delivered at the opposite side of the rolls ready for use as soon as dried, the leather being moistened previous to its being put through the machine. If it be desired to form single pegs, the rolls will be so adjusted as to bring the edges of the dies into direct contact, so that as the pegs are compressed in the cells or recesses, they will at the same operation be entirely severed. When, however, it is desired to form the pegs in continuous series and have them slightly united for use in machines, then the rolls will be slightly separated, so as to leave a thin film of leather uncut between each of the adjoining pegs. When thus formed they may be coiled into a roll and used the same as the coiled wooden strip is now used in machines.

Fig. 4 represents a pair of rolls in which, instead of a series of cells or recesses, as above described, there is formed a continuous depression extending entirely around the rolls, the depression in the two rolls, when placed opposite each other, forming an opening corresponding in form and size to a longitudinal central section of a finished peg, as represented at *o*. By passing a strip of leather of suitable width between these rolls F G, it will be compressed into a condensed strip, the cross-section of which will be of the size and form of the opening *o*. This strip, when thus prepared, may be used the same as the coiled wooden-peg strip is now used, the machine cutting from the strip a peg at each operation of the driver, as the same is required for being driven. It is obvious that instead of rolls flat dies may be used, on the same plan that dies are now used for forging or shaping metals; or that the dies may be so arranged as to slide to and fro, one or both, and compress the leather into a series of long strips or strings, which may then be cut into pegs of proper length; but the rolls are preferred, as being the simplest and most expeditious plan. In ordinary cases we prefer to use the leather in its usual state, the compressing to which it is subjected condensing it to such a degree as to render the pegs thus formed sufficiently rigid to enable them to be driven similar to the ordinary wooden peg. In case, however, it be desired to use soft or spongy leather, then we propose to prepare the leather by first saturating it with any suitable solution, such as shellac or the insoluble cement used for uniting leather; and in all cases it may be desirable to first compress the leather by passing it between rolls previous to submitting it to the operation of the dies. It is obvious that the pegs may be made round, square, diamond-shaped, or of any required form, by simply forming the dies of the requisite shape.

Although our process and machine are specially adapted to form our newly-invented leather peg, it is obvious that the same process and machine may be used to form pegs of other material, as, for instance, of wood, the strips of peg-wood being first steamed and then run through the machine, the great advantage of which would be that the pegs would be so compressed as to occupy a small space when driven, and when wet thereafter they would so swell or increase in diameter as to fill the hole more perfectly, and hold the parts more tightly together.

We do not desire to be understood as limiting ourselves to the special devices herein described, but having thus described our improved process of making pegs, and also several devices accomplishing the result, what we claim, is—

1. The process of making pegs by compressing or condensing leather, substantially as described, whether the pegs be severed at the time of compression, or the strip be first condensed and then cut into separate pegs.

2. We claim two or more rolls having recesses or dies formed on their periphery, and arranged to operate as described, for the purpose of compressing leather or other material to form pegs, substantially as set forth.

CHS. ROWLAND,
JOSEPH G. ROWLAND.

Witnesses:
N. F. ENGLISH,
A. B. BURK,
FRANCIS C. MOORE,
J. B. GILPIN.